United States Patent
Zilliacus

(10) Patent No.: US 7,676,193 B2
(45) Date of Patent: Mar. 9, 2010

(54) SELECTION AND TUNING OF A BROADCAST CHANNEL BASED ON INTERACTIVE SERVICE INFORMATION

(75) Inventor: Martin Zilliacus, Kauniainen (FI)

(73) Assignee: Nokia Corporation, Espoo (FI)

( * ) Notice: Subject to any disclaimer, the term of this patent is extended or adjusted under 35 U.S.C. 154(b) by 510 days.

(21) Appl. No.: 10/411,161

(22) Filed: Apr. 10, 2003

(65) Prior Publication Data
US 2004/0203338 A1      Oct. 14, 2004

(51) Int. Cl.
*H04H 40/00* (2008.01)
(52) U.S. Cl. .................................. 455/3.06; 455/41.2
(58) Field of Classification Search ................ 455/466, 455/560, 566, 3.06, 41.2, 3.04, 80; 725/9, 725/46, 25, 38, 134, 142
See application file for complete search history.

(56) References Cited

U.S. PATENT DOCUMENTS

| | | | | |
|---|---|---|---|---|
| 5,195,134 | A * | 3/1993 | Inoue | 380/242 |
| 5,822,324 | A | 10/1998 | Kostresti et al. | |
| 2002/0152091 | A1 * | 10/2002 | Nagaoka et al. | 705/1 |
| 2003/0093790 | A1 * | 5/2003 | Logan et al. | 725/38 |
| 2004/0073915 | A1 * | 4/2004 | Dureau | 725/9 |
| 2004/0097246 | A1 * | 5/2004 | Welch | 455/466 |

FOREIGN PATENT DOCUMENTS

| | | |
|---|---|---|
| GB | 2370456 | 8/2002 |
| JP | 2002271824 | 9/2002 |
| WO | WO 99/34564 | 7/1999 |
| WO | WO 99/34599 | 7/1999 |
| WO | WO 01/48715 | 7/2001 |

OTHER PUBLICATIONS

European Search Report for European Application No. 04101195.8 dated Jun. 15, 2004.

* cited by examiner

*Primary Examiner*—Tu X Nguyen
(74) *Attorney, Agent, or Firm*—Banner & Witcoff Ltd.

(57) ABSTRACT

The present invention provides methods and apparatus for tuning a broadcast processing system by using channel data from an interactive information source. The broadcast processing system interfaces with a broadcast medium and may include an interfacing apparatus that interfaces to the broadcast medium for extracting an appropriate broadcast signal and for tuning the broadcast processing system. The viewer uses a mobile terminal that communicates with the interactive information source over a first wireless communications path. The viewer may interact with the web site by navigating through the associated web pages in order to obtain broadcast information about the selected program, in which the broadcast information may be sent to the mobile terminal over the first wireless communications path. The broadcast information is processed by the wireless terminal in order to obtain the channel data. Consequently, the channel data may be sent to the broadcast processing system in order to tune the broadcast processing system to the selected program.

22 Claims, 12 Drawing Sheets

SELECTION AND TUNING OF A BROADCAST CHANNEL BASED ON INTERACTIVE SERVICE INFORMATION

FIELD OF THE INVENTION

The present invention relates to selecting and tuning a broadcast channel. In particular, the invention relates to apparatus and methods obtaining broadcast information and using the information for instructing a broadcast processing system.

BACKGROUND OF THE INVENTION

A viewer (user) typically tunes a television channel with a remote control that may directly interact with a television set or through a set top box (STB). The television set may support digital or analog television transmission. The television (possibly through the STB) may receive the television transmission through different types of networks, including television cable, radio frequency (RF), satellite, and telephone. The different types of networks may further have different variations. For example, a telephone network may support digital transmission, including circuit switched or packet switched services, and may provide an interface to Internet stream services.

FIG. 1 shows an arrangement 100 for tuning a television 103 in accordance with prior art. In the embodiment, television 103 displays a selected program, although variations of the embodiment may utilize other display instruments, including a personal computer (PC) and an associated monitor. Television 103 accesses signals that convey broadcast programs from a network 107 through a set top box (STB) 105. Network 107 can correspond to one of different types of networks, including satellite, cable, and telephone networks. STB 105 processes signals from network 107 so that the processed signal can be utilized by television 103 for showing a selected broadcast program on a monitor that is associated with television 103. (The combination of STB 105 and television 103 is referred as broadcast processing system 101.) A viewer (that may be referred to as a user) controls television 103 by sending commands from a remote control 109 over a wireless communications path 111 that typically operates in an infrared or radio frequency (RF) transmission spectrum.

From the perspective of the viewer, a major objective is to watch a broadcast program when the viewer wants to view the broadcast program, regardless of the delivery of the transmission and the location of the viewer. Typically, the viewer may determine the availability of the selected broadcast program from a magazine or newspaper and subsequently initiate the viewing of the broadcast program through a remote control. In such a case, the viewer typically must remember the time of the broadcast program; otherwise, the viewer may miss the broadcast program or may initiate the viewing of the broadcast program after the broadcast program has started. Alternatively, the viewer may view an electronic program guide (EPG) that is provided by the set top box and shown by the associated television. The viewer can view the program schedule and select a program for viewing through a remote control.

For each of the above scenarios, a viewer selects a channel through a remote control. However, information about broadcast programs is readily available, in which content about the program is presented. For example, a television network (e.g. NBC and MTV) may support an Internet web site that provides schedule and content information about programs being broadcast by the television network. The viewer may wish to select a program based on content information through an interactive environment. Moreover, the viewer often desires mobility to control program selection within or outside the viewer's home. Consequently, it would be an advancement of the art if apparatuses and methods would provide untethered control to a television that utilizes and integrates an interactive environment to obtain broadcast information for selection a broadcast program.

BRIEF SUMMARY OF THE INVENTION

An aspect of the present invention provides methods and apparatus for tuning a broadcast processing system, e.g. a television, by using channel data from an interactive information source. The broadcast processing system interfaces with a broadcast medium, e.g. a cable network, a satellite network, and a telephone network. The broadcast processing system may include an interfacing apparatus that interfaces to the broadcast medium for extracting an appropriate broadcast signal and for tuning the broadcast processing system. The viewer uses a mobile terminal that communicates with the interactive information source, e.g. a corresponding web site, over a first wireless communications path. The viewer may interact with the web site by navigating through the associated web pages in order to obtain broadcast information about a selected program, in which the broadcast information may be sent to the mobile terminal over the first wireless communications path. The broadcast information is processed by the wireless terminal in order to obtain the channel data. Consequently, the channel data may be sent to the broadcast processing system in order to tune the broadcast processing system to the selected program.

In an exemplary embodiment of the invention, the broadcast processing system includes a set top box and a television. The viewer connects to a desired mobile service by utilizing a wireless cellular communication system through a wireless application protocol (WAP). Consequently, a mobile application may be downloaded to the mobile terminal. When executing, the mobile application prompts the viewer about a television environment, alerts the viewer about a showing of the selected program, prompts the viewer whether the viewer wishes to view the selected program, and sends channel data to the set top box so that the set top box can tune the television.

In another embodiment of the invention, channel data is downloaded from the interactive program source. The mobile terminal compares the downloaded data with the corresponding data from a set top box. The mobile terminal may update its data, such as a current time, to be consistent with the time as maintained by the set top box.

A variation of the embodiment may support a digital video broadcast (DVB) tuner that supports multicast services, such as provided by an associated MPEG-2 (Motion Picture Expert Group) transport stream (TS). DVB services may be broadcasted/multicast over different transport media, including terrestrial facilities (DVB-T), satellite facilities (DVB-S), cable facilities (DVB-C), and other coming relevant facilities.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
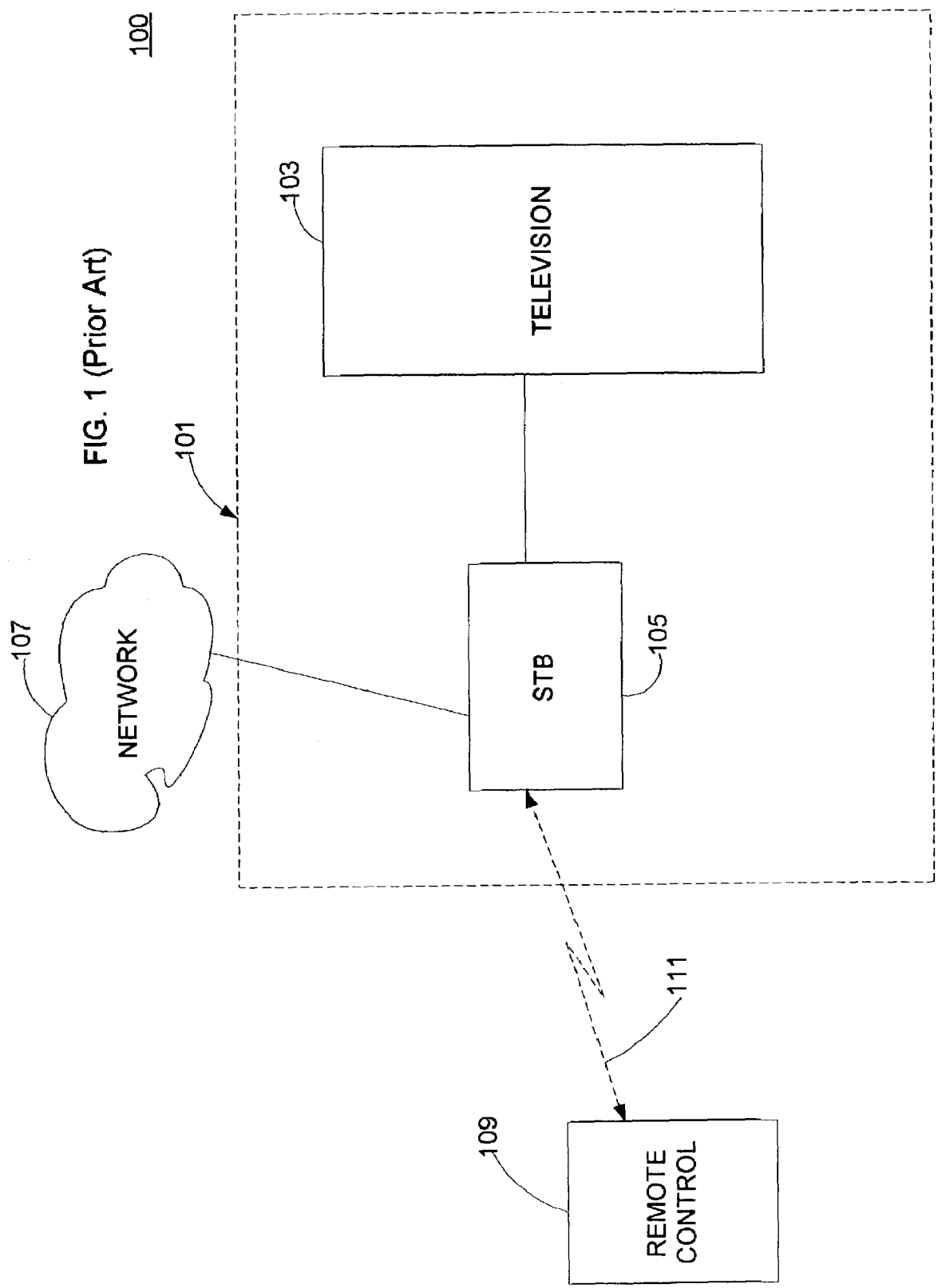
FIG. 1 shows an arrangement for tuning a television in accordance with prior art.
Figure 2:
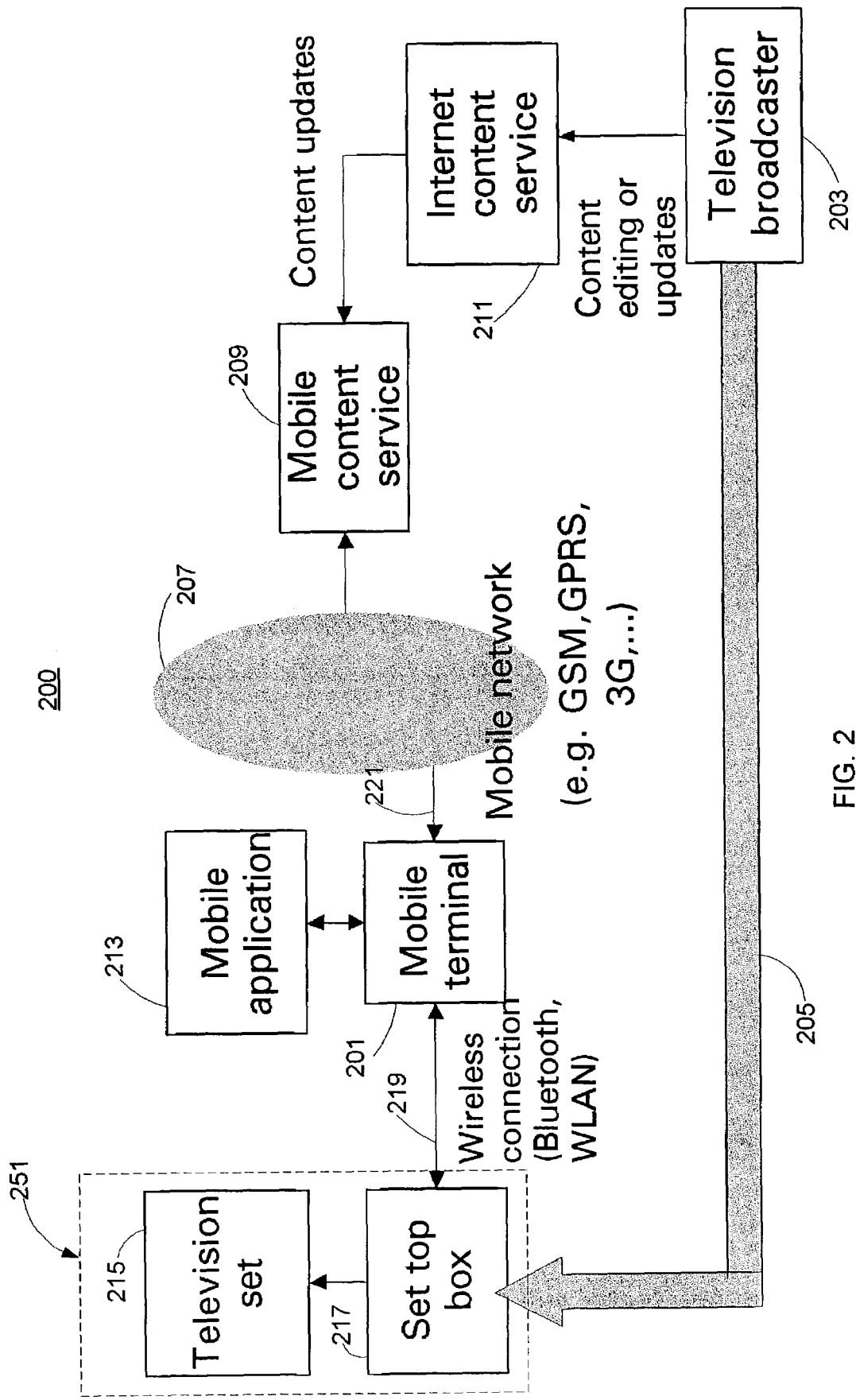
FIG. 2 shows an arrangement for obtaining broadcast information for a selected program and tuning a television using the broadcast information in accordance with an embodiment of the invention.

FIG. 2 shows an arrangement 200 for obtaining broadcast information for a selected program and tuning a television 215 using broadcast information from an interactive information source 209 in accordance with an embodiment of the invention. The broadcast information may include different data objects such as schedule data and a mobile application that is executed by mobile terminal 201 in order to interact with a viewer. The viewer (user), using mobile terminal 201, connects to a mobile service 209 (e.g. a favorite television show, as for example, "Friends") with a wireless application protocol (WAP) or a Web browser through a wireless communications path 221 and a mobile transmission network 207. Mobile network 207 may support different wireless technologies, including Global System for Mobile Communications (GSM), General Packet Radio Service (GPRS), and third generation (3G) services. Alternatively, the user may access mobile service 209 by utilizing a short message service (SMS). A television broadcaster 203 may update mobile service 209 through an Internet content service 211. As will be discussed, mobile terminal 201 downloads a mobile application 213 from mobile service 209.

Television broadcaster 203 transmits one or more broadcast programs through a transmission medium 205. Transmission medium 205 utilizes commonly an unidirectional broadcast link and the transmission medium 205 may utilize one of different types of media, including cable, telephone and satellite systems. A transmission system may support analog transmission and digital transmission.

A set top box 217 interfaces to transmission medium 205 and provides television 215 a signal that conveys a selected program. (In the embodiment, a broadcast processing system 251 comprises set top box 217 and television 215. In the embodiment, system 251, either at television 215 or at set top box 217, may have a receiver, e.g. a Bluetooth communication module or other wireless interface, for communicating with the wireless terminal 201. A connection between wireless terminal 201 and system 251 may be implemented through an infrared link. However, with other embodiments of the invention, broadcast processing system 251 may not include a separate tuner such as set top box 217 if corresponding tuning capability is contained in the television 215. Moreover, with other embodiments, broadcast processing system 251 may utilize another type of tuner such as a digital video broadcast tuner.) Set top box 217 may receive and unscramble incoming signals and may also function as a multimedia desktop computer that can run a variety of advanced services such as videoconferencing, home networking, IP telephony, video-on-demand (VoD) and high-speed Internet TV services. Moreover, variations of the embodiment may utilize a digital video broadcast (DVB) tuner that supports multicast services as provided by an associated MPEG-2 (Motion Picture Expert Group) transport stream (TS). DVB services may be broadcasted over different transport media, including terrestrial facilities (DVB-T), satellite facilities (DVB-S), and cable facilities (DVB-C). A plurality of services are typically transmitted over a common data stream.

Set top box 217 provides a selected program for viewing on television 215 by being instructed by mobile terminal 201 through a wireless communications path 219. In the embodiment, mobile terminal utilizes the Bluetooth specification for wireless communications path 219. Bluetooth is a short-range radio network, originally intended as a cable replacement. It can be used to create networks of up to eight devices operating together. The Bluetooth Special Interest Group, Specification Of The Bluetooth System, Volumes 1 and 2, Core and Profiles: Version 1.1, 22nd Feb. 2001, describes the principles of Bluetooth device operation and communication protocols. The devices operate in the 2.4 GHz radio band reserved for general use by Industrial, Scientific, and Medical (ISM) applications. However, other embodiments of the invention may utilize other specifications that may be standardized, e.g. the Institute of Electrical and Electronics Engineers (IEEE) 802.11 standard or that may be proprietary.

IEEE 802.11 refers to a family of specifications developed by the IEEE for wireless LAN technology. IEEE 802.11 specifies an over-the-air interface between a wireless client and a base station or between two wireless clients. The IEEE accepted the specification in 1997. IEEE 802.11 encompasses several extensions, including 802.11a, 802.11b, and 802.11g. IEEE 802.11b is a 1999 ratification to the original 802.11 standard.

Figure 3:
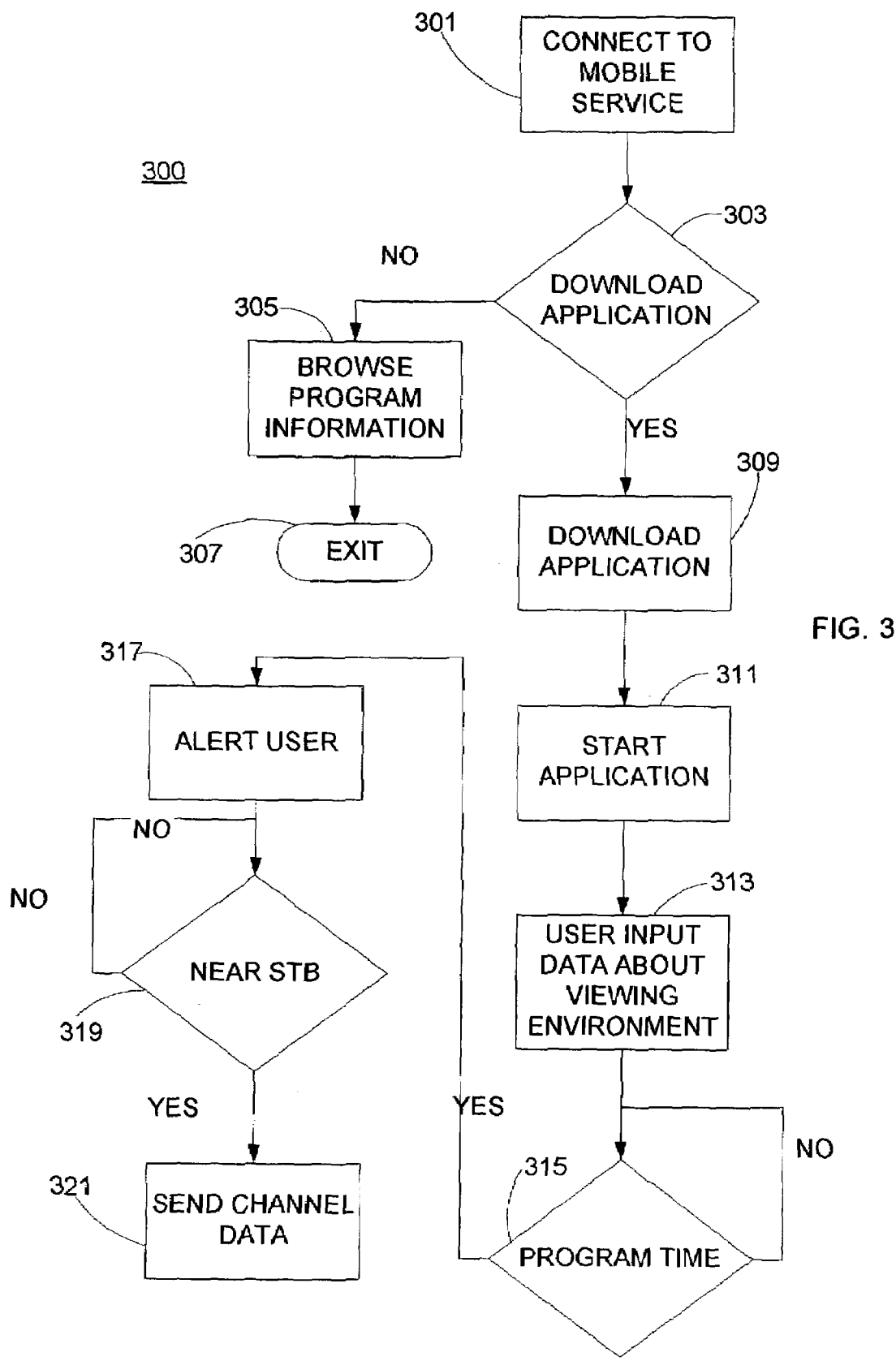
FIG. 3 shows a flow diagram corresponding to the arrangement that is shown in FIG. 2.

FIG. 3 shows a flow diagram 300 corresponding to arrangement 200 that is shown in FIG. 2. In step 301, mobile terminal 201 connects to mobile service 209 using, for example, a wireless application protocol (WAP). The viewer is prompted by mobile service 209 whether the viewer wishes to download, for example, the "Friends" mobile application 213. The viewer accepts the download in step 303 and the download of application 213 occurs in step 309. As a result, a link to the application is provided to the viewer. If the viewer does not choose to download application 213 in step 303, the viewer may continue to browse program information from mobile service 209 in step 305.

In the embodiment that is shown in FIGS. 2 and 3, the broadcast information may be stored locally in mobile terminal 201, either as an integrated application, e.g. a MIDlet, which conforms to J2ME (Java 2 Micro Edition) APIs, or as a calendar event that notifies the viewer that the show is starting. Mobile application 213 may be used while the viewer is traveling, e.g. the terminal may communicate with STB 217 in a hotel room tuning to the selected television channel locally.

In step 311, the viewer activates the "Friends" application 213. Consequently, the viewer is prompted to input data about the television environment (e.g. whether television 215 is operating with cable, satellite or terrestrial transmission service). At program time, as determined by step 315, the viewer is alerted when the selected television program is about to start in step 317. Alternatively, in variations of the embodiment, short message service (SMS) or mobile multimedia service (MMS) may be invoked by mobile service 209 to alert the viewer. In step 319, if mobile terminal 201 is sufficiently near set top box 217 so that communications over wireless communications path 219 may be adequately supported, application 213 initiates a connection to set top box 217 and channel data is sent to set top box 217 in step 321. Consequently, the viewer is prompted with a notification "Do you want to tune to Friends on your television" as shown on the screen of television 215. If the viewer accepts, set top box 217 tunes television 215 to "Friends."

Figure 4:
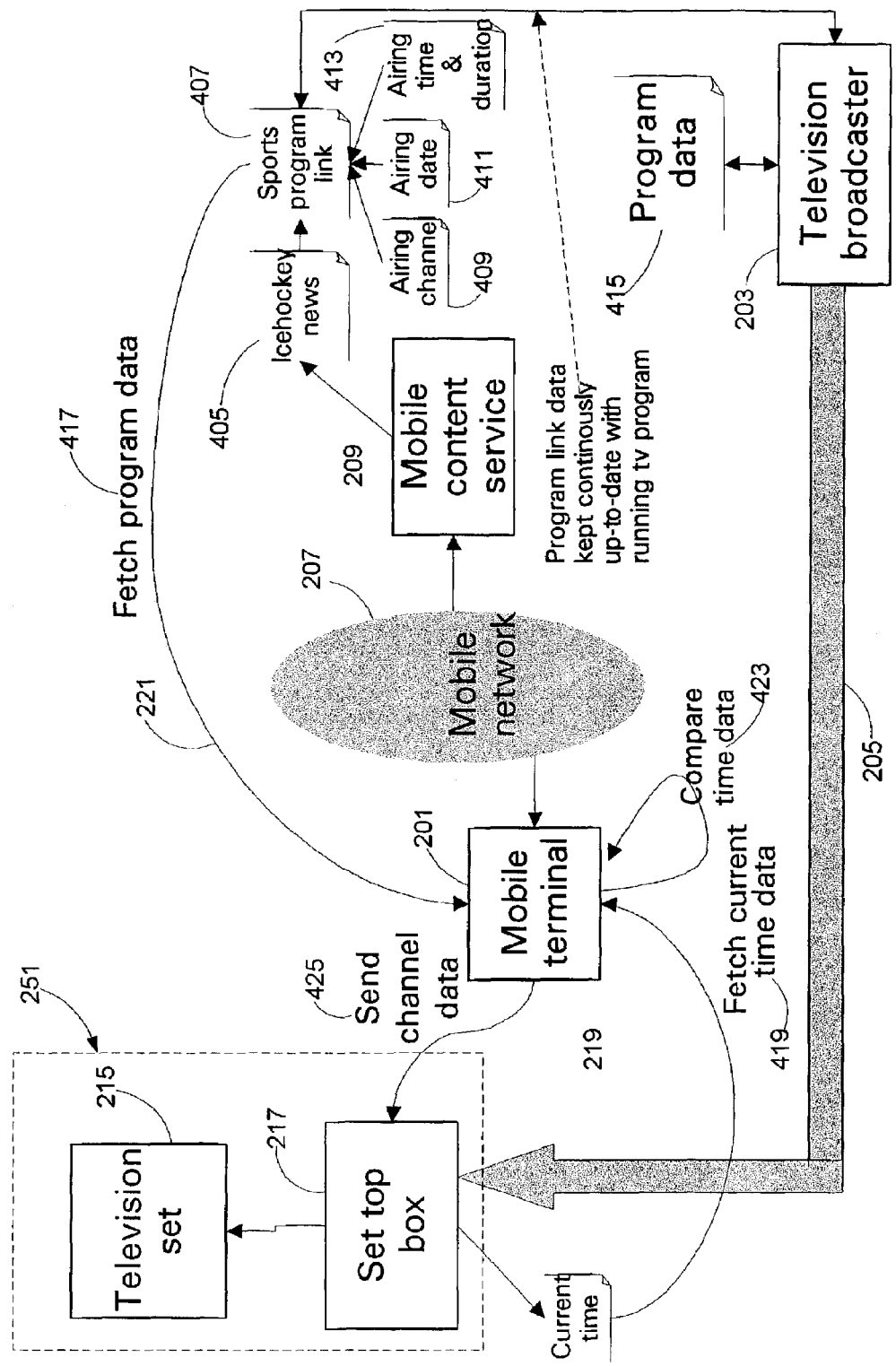
FIG. 4 shows a second arrangement for obtaining broadcast information for a selected program and tuning a television using the broadcast information in accordance with an embodiment of the invention.

FIG. 4 shows an arrangement 400 for obtaining broadcast information for a selected program and tuning television 215 using the broadcast information in accordance with an embodiment of the invention. Broadcast processing system 251 comprises television 215 and set top box 217. As with arrangement 300 as shown in FIG. 3, mobile terminal 201 connects to mobile service 209 through wireless communications path 221 and mobile network 207 using, for example, a WAP browser. The viewer browses a desired web site. In arrangement 400, for example, the viewer browses icehockey results 405, finds a link to sports 407, which provides broadcast data such as a broadcast channel 409, airing date 411, and airing time and duration 413. Broadcast data 417 is sent to mobile terminal 201 through mobile network 207 and wireless communications path 221. Mobile terminal 201 may communicate with set top box 217 in order to synchronize time with message 419 over wireless communications path 219. (Set top box 217 receives data such as time from information being sent from television broadcaster 203 on transmission medium 205.) The data received from mobile service 209 is compared with the data received from set top box 217 in action 423. If an inconsistency is determined, a corresponding notification may be provided to the viewer on a user output device of mobile terminal 201. An application that executes on mobile terminal 201 determines whether the selected program is running or is still scheduled to be run. If so, mobile terminal 201 sends channel data to set top box 217, and notification is shown on the screen of television 215 whether the viewer wishes to view the program. If the viewer indicates so, as by inputting an appropriate response through a user input device of mobile terminal 201, set top box 217 tunes television 215 in accordance with channel data sent to set top box 217 from mobile terminal 201.

Figure 5:
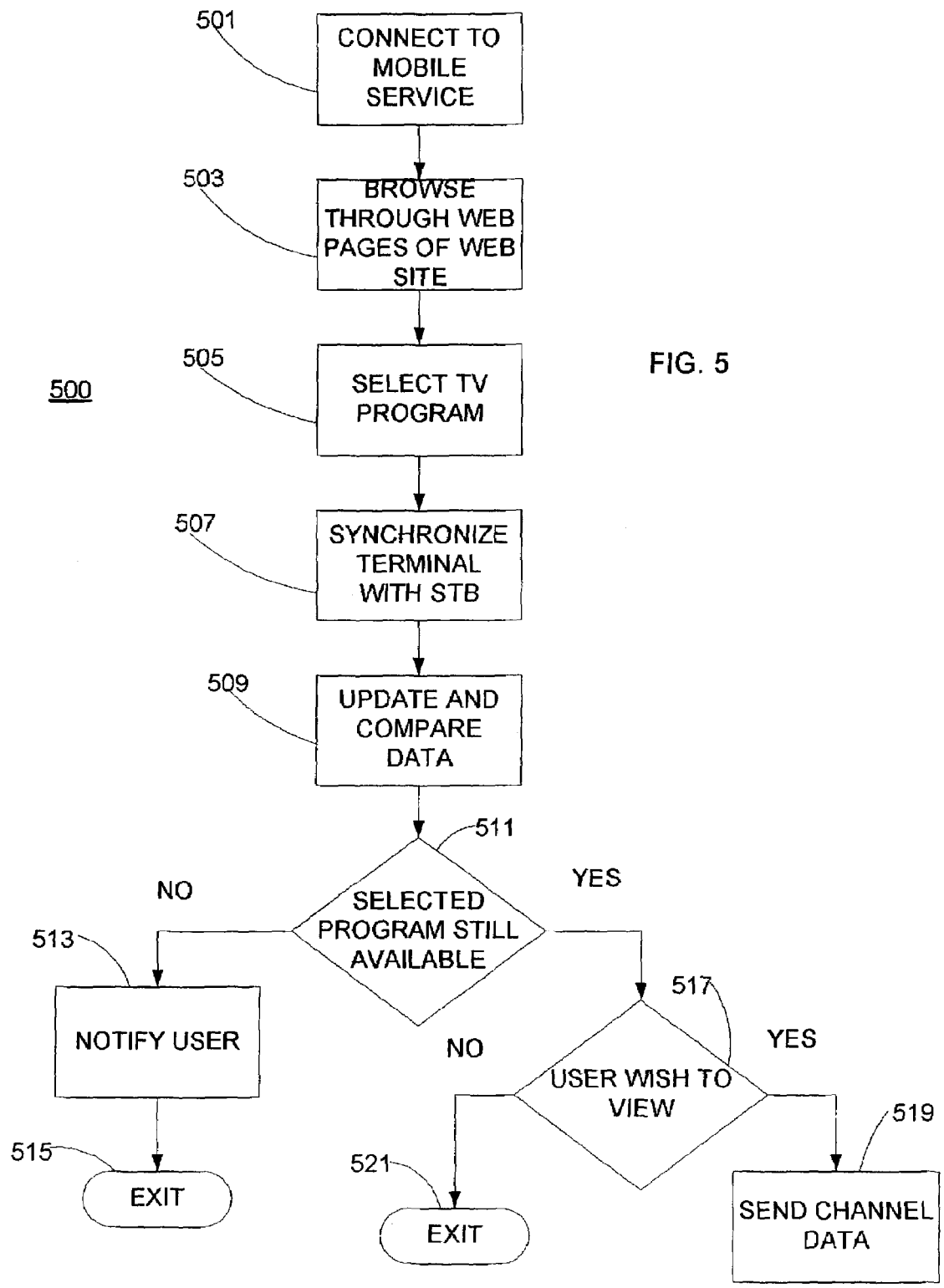
FIG. 5 shows a flow diagram corresponding to the arrangement that is shown in FIG. 4.

FIG. 5 shows a flow diagram 500 corresponding to arrangement 400 that is shown in FIG. 4. In step 501, mobile terminal 201 connects to mobile service 209. In step 503, the viewer browses through the web pages of the selected web site. The viewer selects a program link to download broadcast data in step 505. In step 507, mobile terminal 201 synchronizes with set top box 217 if mobile terminal 201 is within an operating range of set top box 217. In step 509, mobile terminal 201 receives the current time that is maintained by set top box 217, and mobile terminal 201 compares its data with what is provided by set top box 217. If the selected program may still be viewed, as determined by step 511, the viewer is prompted as to whether the viewer wishes to view the program. In step 517, prompting is provided by a notification that is shown on the screen of television 215. If so, channel data is sent to set top box 217 in step 519, and television 215 is tuned to the selected program. In step 513, if the selected program is not available for viewing, the viewer is notified on the screen of television 215.

Figure 6:
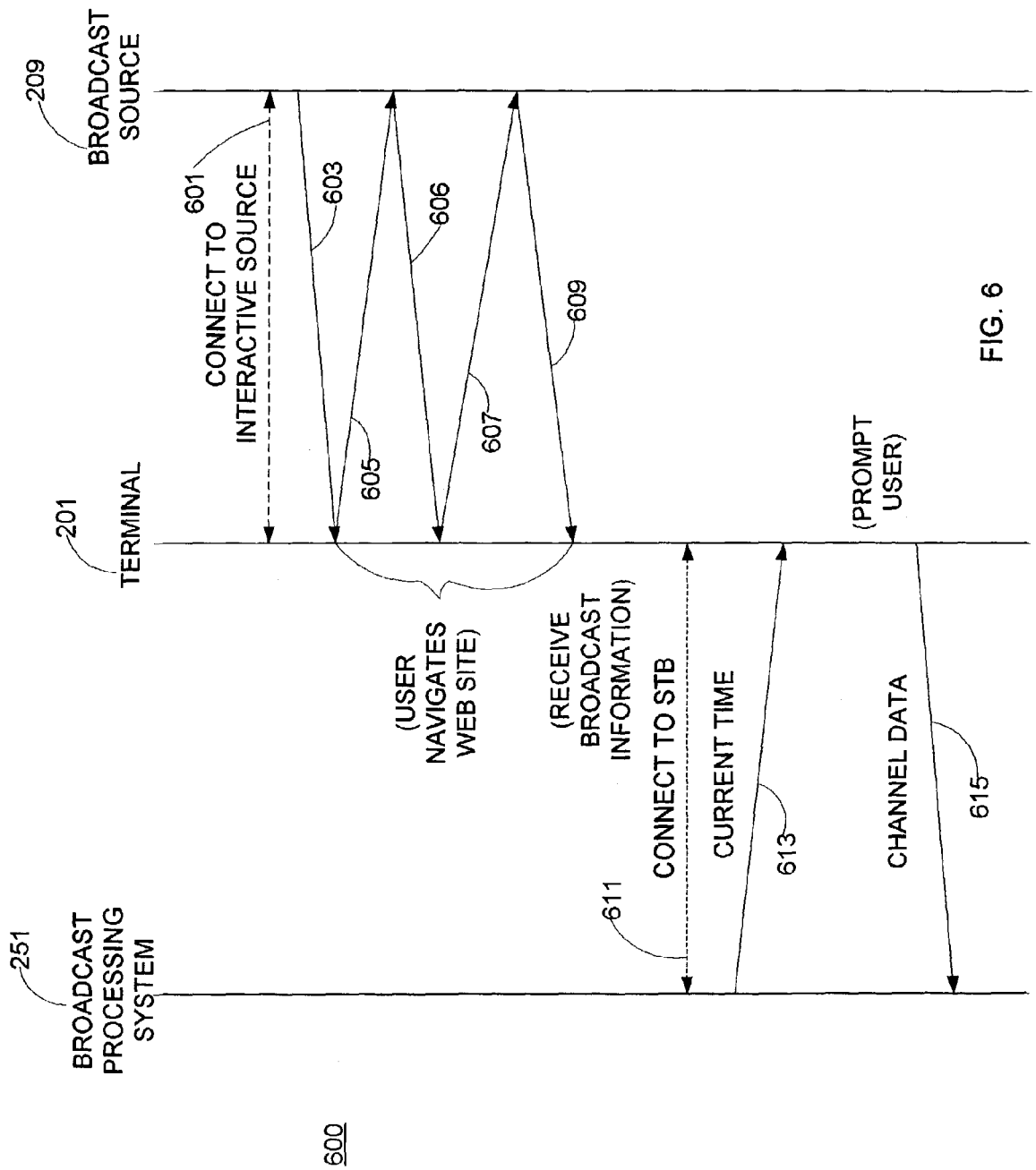
FIG. 6 shows a message scenario that corresponds to the arrangement that is shown in FIG. 4.

FIG. 6 shows a message scenario 600 that corresponds to arrangement 400 as shown in FIG. 4. Wireless terminal 201 connects to interactive information source 209 over wireless communications path 221 in procedure 601. Information source 209 displays the home web page through message 603, and the viewer selects an appropriate entry from the home web page in message 605. The viewer continues to navigate through the associated web pages in messages 606-609. Mobile terminal 201 receives broadcast information in message 609. Mobile terminal 201 subsequently connects to broadcast processing system 251 (through STB 217) with procedure 611 over wireless communications path 219. Mobile terminal 201 receives the current time in message 613, and mobile terminal 201 sends channel data to broadcast processing system 251 to appropriately tune broadcast processing system 251 if the viewer wishes to view the selected program.

Figure 7:
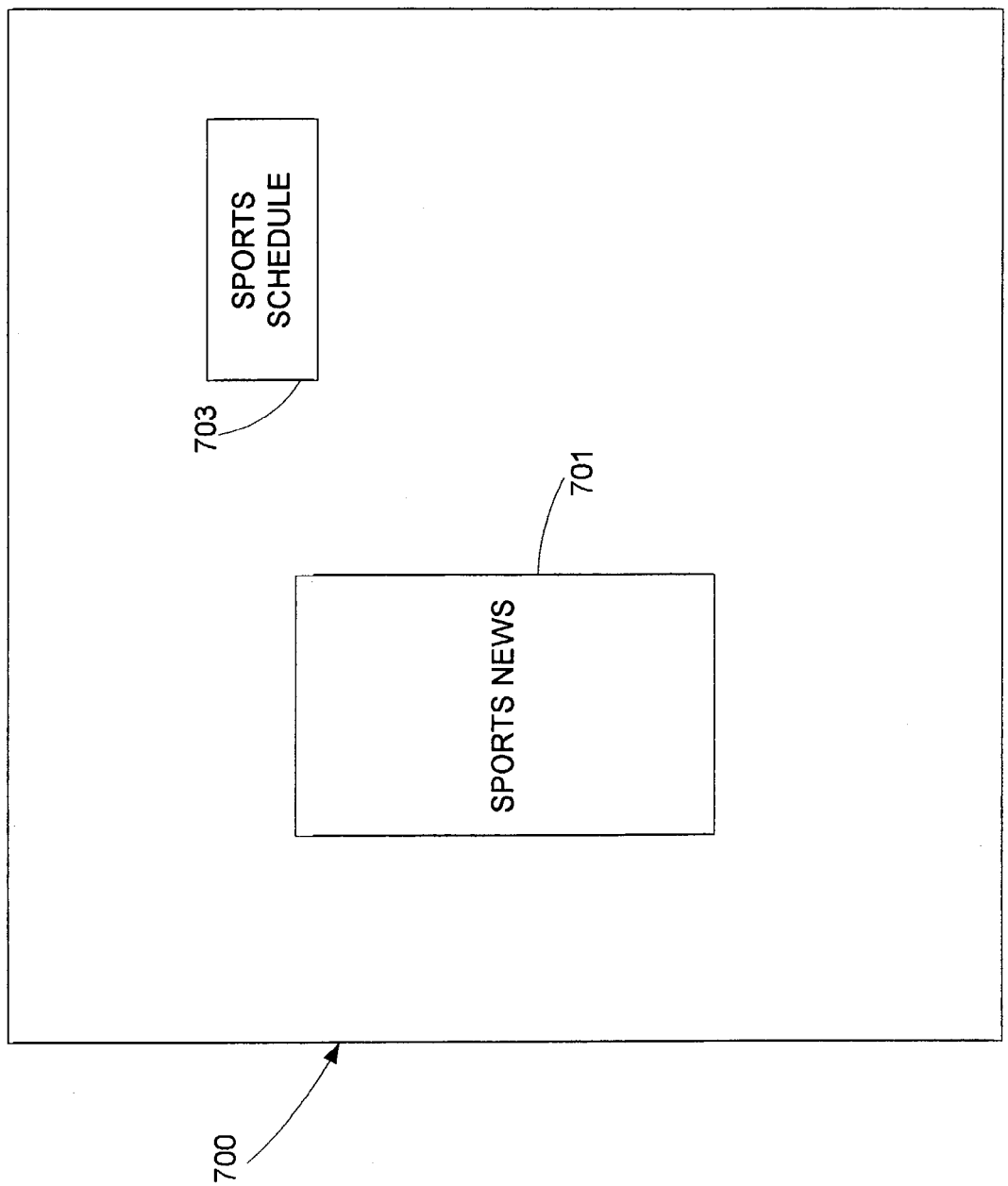
FIG. 7 shows a web page that is provided by a mobile service in accordance with an embodiment of the invention.

FIG. 7 shows a web page 700 that is provided by mobile service 209 in accordance with an embodiment of the invention. In an example of the embodiment, the viewer can read sports news in a display area 701 or may select to view a sports schedule of upcoming sports events by selecting a sports schedule entry 703. In this example, the viewer wishes to obtain the sports scheduling that is provided by the viewer's local cable service and thus selects sports schedule entry 703.

Figure 8:
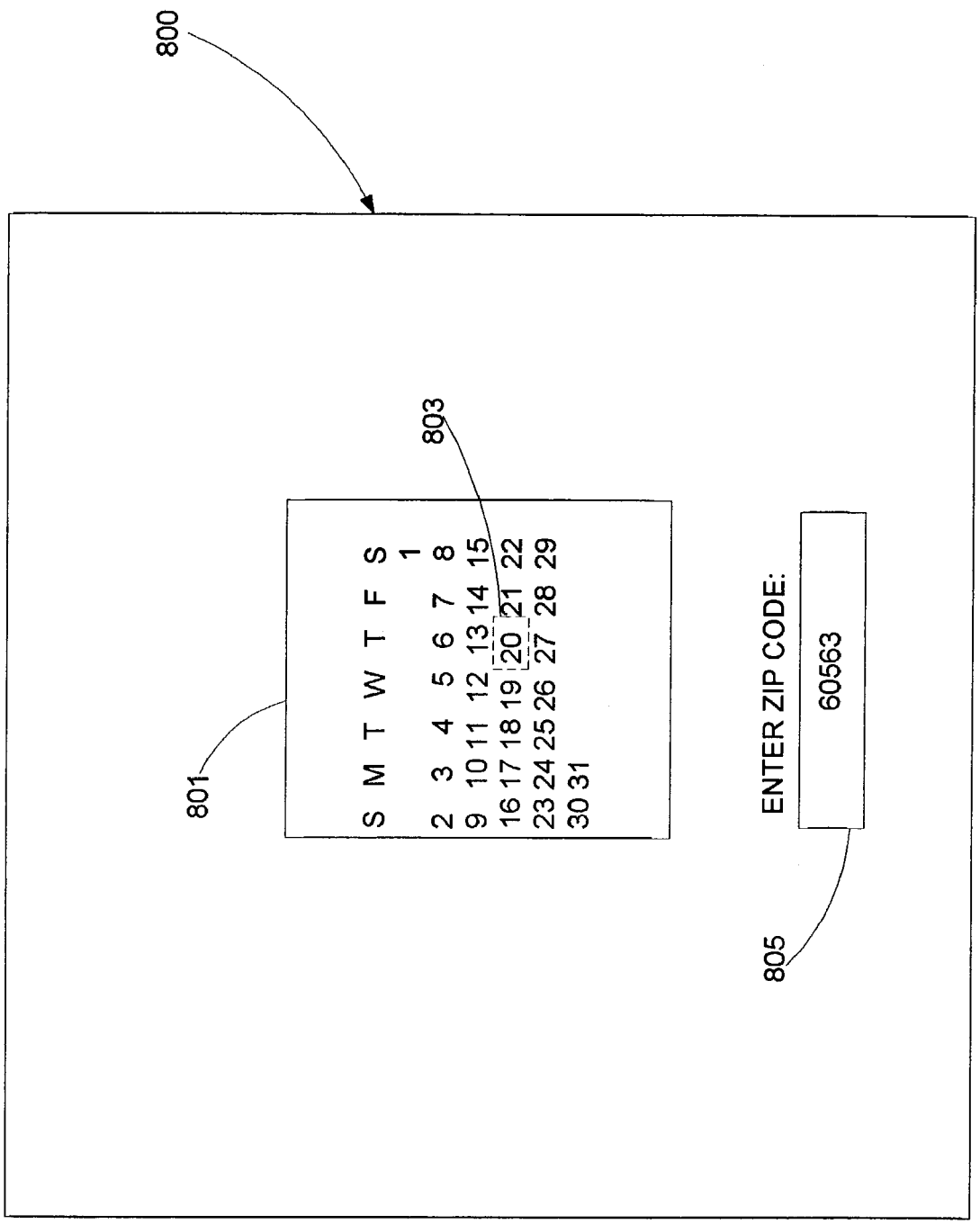
FIG. 8 shows a web page linked to the web page that is shown in FIG. 7.

If the viewer selects sports entry 703, web page 800 is shown on the output device of terminal 201. A calendar display area 801 shows the calendar of the month. In the example shown in FIG. 8, the viewer selects the $20^{th}$ day of the month by selecting an entry 803 and also enters a zip code of the viewer's residence in an entry 805.

Figure 9:
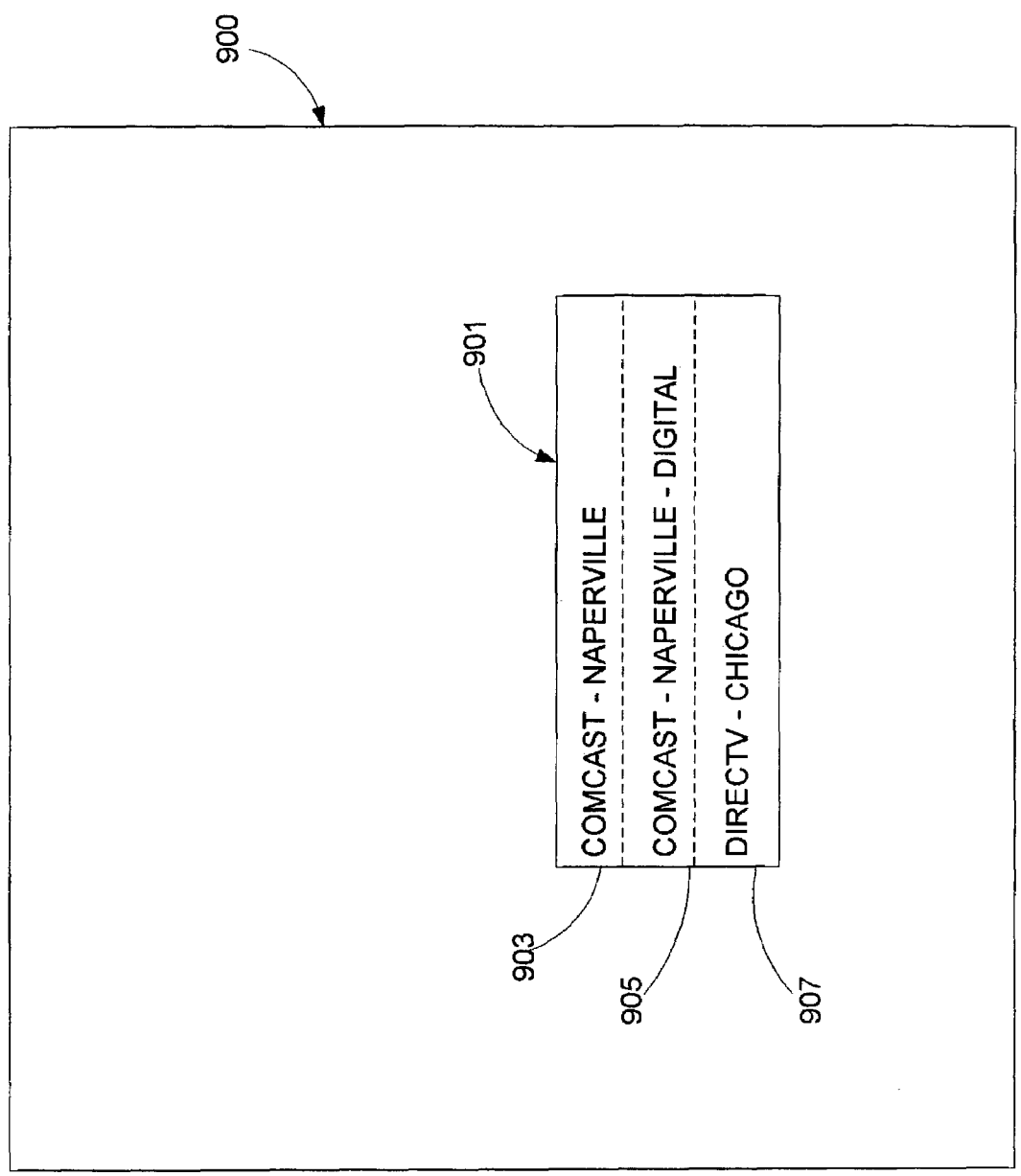
FIG. 9 shows a web page linked to the web page that is shown in FIG. 8.

Consequently, web page 900 is shown to the viewer, in which the viewer selects a cable service that the viewer subscribes to. In the example that is shown in FIG. 9, three different cable services are available to subscribers in the city of Naperville, corresponding to entries 903, 905, and 907. In the example, the viewer selects entry 903, corresponding to "COMCAST-NAPERVILLE". Of course, zip code and cable service information may be stored locally, such as through the use of a cookie.

Figure 10:
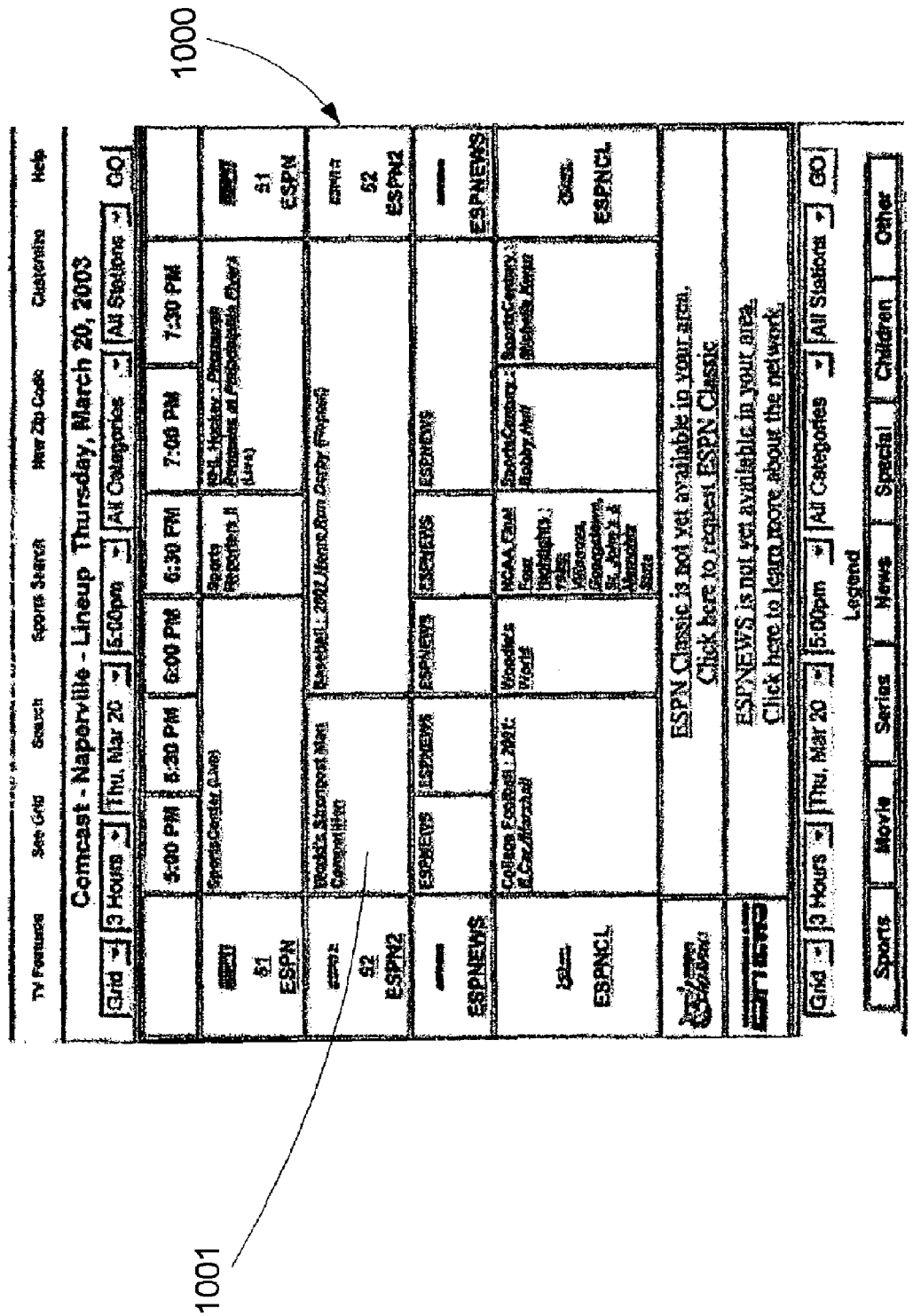
FIG. 10 shows a web page linked to the web page that is shown in FIG. 9.

FIG. 10 shows a web page 1000 linked to web page 900 that is shown in FIG. 9. The viewer may choose a selected program from the schedule that is provided in web page 1000. In the example, the viewer selects an entry 1001, corresponding to "World's Strongest Man Competition." In the example, broadcast data is sent from mobile service 209 to wireless terminal 201 for the selected program. Moreover, content information may also be provided to mobile terminal 201 so that the viewer can obtain a description of the competition, including the participants as well as the events of the competition.

Figure 11:
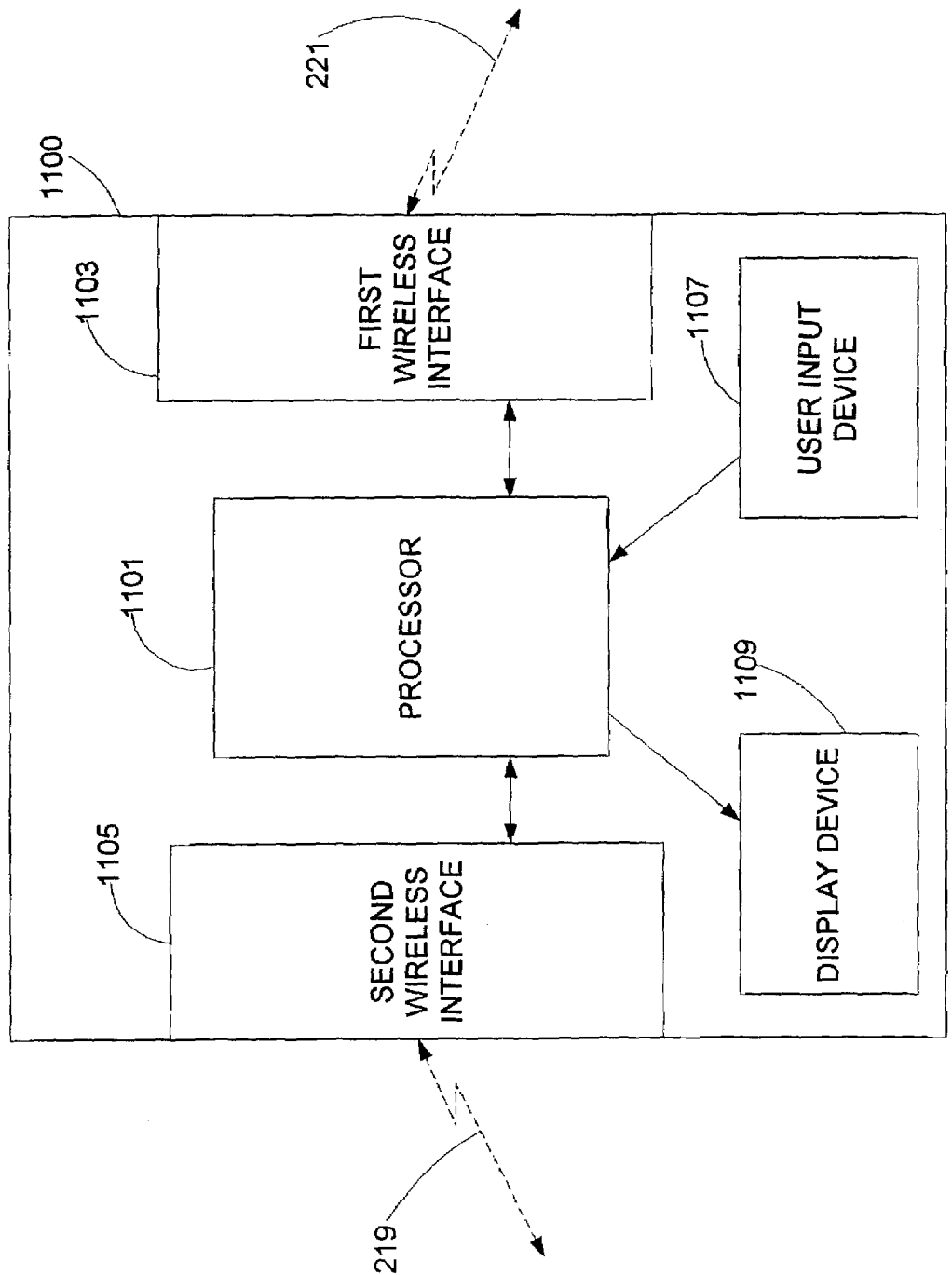
FIG. 11 shows a functional architecture of a wireless terminal corresponding to FIGS. 2 and 4.

FIG. 11 shows a functional architecture 1100 of wireless terminal 201 corresponding to FIGS. 2 and 4. Wireless terminal 201 comprises a processor 1101, a first wireless interface 1103, a second wireless interface 1105, an input device 1107, and a display device 1109. First wireless interface 1103 communicates with interactive information source 209 over wireless communications path 221, and second wireless interface 1105 communicates with STB 217 over wireless communications path 219. According to one embodiment of the present invention, the wireless communication path 221 is a cellular network, and the wireless communication path 219 is a short-range communication network such as, for example, Bluetooth. Interfaces 1103 and 1105 may be implemented with the same physical device or with different physical devices. Processor 1101 processes broadcast information that is received from interactive information source 209 in order to obtain channel data that may be sent to STB 217 for tuning television 215 to the selected program. The viewer provides input through input device 1107 when participating in an interactive session with interactive information source 209 and when indicating whether the viewer wishes to view the selected program in response to a notification on the screen of television 215. The viewer views web pages that are provided by interactive source 209 during the interactive session.

Figure 12:
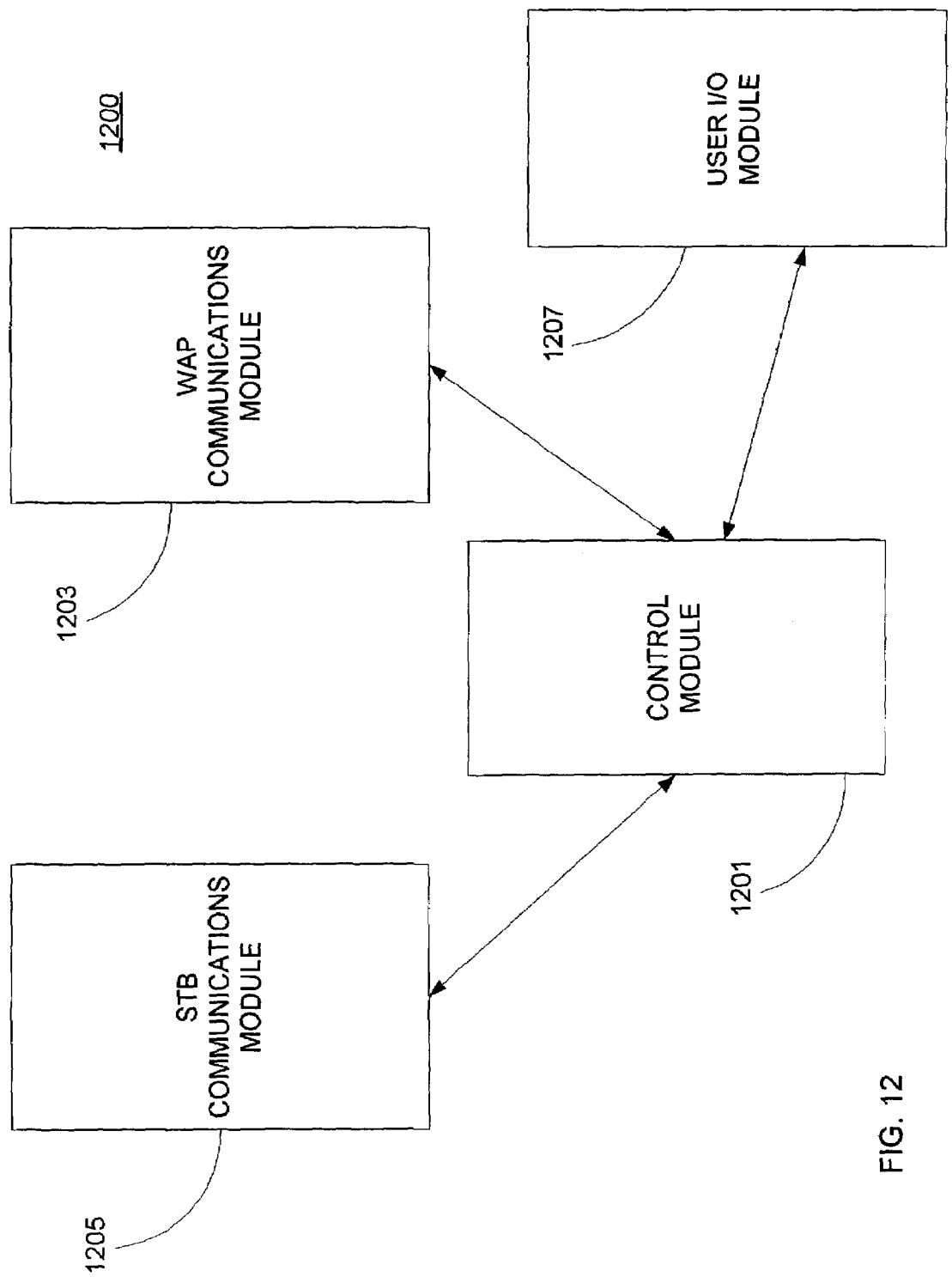
FIG. 12 shows a software architecture of a wireless terminal corresponding to FIGS. 2 and 4.

FIG. 12 shows a software architecture 1200 of wireless terminal 201 that is shown in FIGS. 2 and 4 in accordance with an exemplary embodiment of the invention. Software architecture 1200 may be implemented in processor 1101, first wireless interface 1103, and second wireless interface 1105 as shown in FIG. 11. Software architecture 1200 comprises a control module 1201, a wireless application protocol (WAP) module 1203, a set top box communications module 1205, and a user input/output module 1207. WAP module 1203 supports messaging with mobile service 209 over wireless communications path 221, and STB communications module 1205 supports messaging with STB 217 over wireless communications path 219. Control module 1201 processes broadcast data from information source 209 in order to determine channel data for controlling STB 217. In the embodiment, control module 1201 may extract channel data from broadcast information from information source 209. Also, control module 1201 may execute an application (e.g. mobile application 213) that may be downloaded from information source 209. The application may interact with the viewer in order to determine the viewing environment and to provide a notification about the selected program's showing. User input/output module 1207 enable the viewer to navigate interactive information source 209, to input program selections, and to view web pages from information source 209.

A software program that may execute the steps as shown in flow diagrams 300 and 500 and that may be executed by processor 1101. The software program may be downloaded into mobile terminal 201 by sending a signal that conveys constituent components of the software program. In the embodiment, for example, the signal may be transmitted by utilizing over the air (OTA) capabilities of mobile network 207.

In a variation of the embodiment, the viewer may record, in accordance with applicable copyright laws, a broadcast program on a recording medium using recording equipment, e.g. as a personal video recorder (PVR) or video home system (VHS) compatible recording equipment.

In another variation of the embodiment, a user of wireless terminal 201 may be at a location where set top box 217 is assessable; however, set top box 201 does not normally access a broadcast program (e.g. a pay-TV channel). The user may be provided services by a service provider that is offering a broadcast program (e.g. a sports event) that the user wishes to view. That being the case, the user may access the service provider so that charges may be paid in order for the user to view the broadcast program on television 215. The user may contact the service provider through a wireless communications path and provide credit card information to the service provider. The wireless communications path may provide encryption and authentication for security purposes. (Alternatively, the user may use a short message service by send a message to a specific telephone number, causing a charge of the SMS message to be debited in an invoice.) During the billing transaction, the user may indicate a location of the user and the type of broadcast service that is available (e.g. satellite, cable, or terrestrial). Once the billing process is completed, the user may be provided viewing information such as an unlock code, and the broadcast program may be directed to the location of the user through transmission medium 205. The user may subsequently send channel data from wireless terminal 201 to set top box 217, where the channel data may include a channel identification, an optional program identification, a start time, an end time or a program time duration, and the unlock code. The unlock code is typically used by set top box 217 to unscramble a signal that received from transmission medium 205 on an associated channel and that conveys the broadcast program. Typically, the unlock code is applicable only for the time that the user pays for. After that time, television broadcaster 203 may no longer transmit the associated channel to set top box 217, or set top box 217 may not be able to unscramble the associated channel with the unlock code.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A method comprising:
   connecting to an interactive information source on an Internet web site by a mobile terminal over a first wireless communications path;
   receiving in the mobile terminal through a user interface a user input selecting a broadcast program on the interactive information source;
   in response to the user input, receiving by the mobile terminal broadcasting program scheduling information comprising a scheduled broadcast time from the interactive information source;
   connecting in the mobile terminal to a broadcast receiving processing system over a second wireless communications path; and
   sending by the mobile terminal at least part of the received broadcasting program scheduling information to the broadcast receiving processing system over the second wireless communications path with instruction to set the broadcast receiving processing system to receive the selected broadcast program on a broadcast transmission network at the scheduled broadcast time.

2. The method of claim 1, further comprising:
   in further response to the user input, receiving content information relating to the selected broadcast program from the interactive information source; and
   displaying the content information.

3. The method of claim 1, wherein the interactive information source is a program information source.

4. The method of claim 1, further comprising:
processing, in the mobile terminal, the received broadcasting program scheduling information to obtain channel data that specifies a broadcast channel; and
sending the channel data to the broadcast receiving processing system over the second wireless communications path with instruction to set the broadcast receiving processing system to receive the broadcast program on the broadcast transmission network.

5. The method of claim 4, wherein the channel data is obtained from a group consisting of a channel identification, a program identification, a programming start time, a programming end time, a program time duration, and an unlock code.

6. The method of claim 1, wherein the broadcast receiving processing system comprises at least one from a group consisting of a television and a set-top box.

7. The method of claim 1, further comprising:
processing the broadcasting program scheduling information to obtain channel data;
storing the channel data; and
if at least one viewing condition is satisfied, retrieving the channel data.

8. The method of claim 7, wherein the at least one viewing condition is selected from the group consisting of a beginning time of a selected program, and an initiation by an external source.

9. The method of claim 1, wherein the received broadcasting program scheduling information comprises an application, and further:
executing the application;
in response to the execution, receiving input data about a viewing environment; and
forming channel data in accordance with the input data.

10. A computer-readable storage medium having computer-executable instructions, that when executed by a processor, cause the processor to perform the method as recited in claim 1.

11. A mobile terminal, comprising:
a processor connected to a memory storing a software program that, when executed, causes the mobile terminal to at least perform the following:
connect to an interactive information source on an Internet web site over a first wireless communications path;
receive through a user interface a user input selecting a broadcast program on the interactive information source;
in response to the user input, receive by the mobile terminal broadcasting program scheduling information comprising a scheduled broadcast time from the interactive information source;
connect to a broadcast receiving processing system over a second wireless communications path; and
send at least part of the received broadcasting program scheduling information to the broadcast receiving processing system over the second wireless communications path with instruction to set the broadcast receiving processing system to receive the selected broadcast program on a broadcast transmission network at the scheduled broadcast time.

12. The mobile terminal of claim 11, further caused to:
in further response to the user input, receive content information relating to the selected program from the interactive information source and display the content information.

13. The mobile terminal of claim 11, wherein the interactive information source is a program information source.

14. The mobile terminal of claim 11, further caused to:
process the received broadcasting program scheduling information to obtain channel data that specifies a broadcast channel; and
send the channel data to the broadcast receiving processing system over the second wireless communications path with instruction to set the broadcast receiving processing system to receive the broadcast program on the broadcast transmission network.

15. The mobile terminal of claim 14, wherein the channel data is obtained from a group consisting of a channel identification, a program identification, a programming start time, a programming end time, a program time duration, and an unlock code.

16. The mobile terminal of claim 11, wherein the broadcast receiving processing system comprises at least one from a group consisting of a television and a set-top box.

17. The mobile terminal of claim 11, further caused to:
store the broadcasting program scheduling information; and
if at least one viewing condition is satisfied, retrieve the broadcasting program scheduling information.

18. The mobile terminal of claim 17, wherein the at least one viewing condition is selected from the group consisting of a beginning time of a selected program, and an initiation by an external source.

19. The mobile terminal of claim 11, wherein the received broadcasting program scheduling information comprises an application, and the mobile terminal is further caused to:
execute the application;
in response to the execution receive input data about a viewing environment; and
form channel data in accordance with the input data.

20. A computer-readable medium having computer-executable instructions, that when executed by a processor, cause the processor to perform a method comprising:
connecting to an interactive information source on an Internet web site over a first wireless communications path;
receiving through a user interface a user input selecting a broadcast program on the interactive information source;
in response to the user input, receiving broadcasting program scheduling information comprising a scheduled broadcast time from the interactive information source;
connecting to a broadcast receiving processing system over a second wireless communications path; and
sending at least part of the received broadcasting program scheduling information to the broadcast receiving processing system over the second wireless communications path with instruction to set the broadcast receiving processing system to receive the selected broadcast program on a broadcast transmission network at the scheduled broadcast time.

21. The computer-readable medium of claim 20, wherein the computer-executable instructions, when executed, cause the processor to:
process the received broadcasting program scheduling information to obtain channel data that specifies a broadcast channel; and
send the channel data to the broadcast receiving processing system over the second wireless communications path with instruction to set the broadcast receiving processing system to receive the broadcast program on the broadcast transmission network.

22. The computer-readable medium of claim 20, wherein the received broadcasting program scheduling information comprises an application, and wherein the computer-executable instructions, when executed, cause the processor to:
  execute the application;
  in response to the execution, receive input data about a viewing environment; and
  form channel data in accordance with the input data.

* * * * *